United States Patent [19]

Okuda

[11] Patent Number: 5,651,746
[45] Date of Patent: Jul. 29, 1997

[54] POWER TRANSMISSION CHAIN

[75] Inventor: Tomonori Okuda, Nabari, Japan

[73] Assignee: Borg-Warner Automotive, K.K., Nabari, Japan

[21] Appl. No.: 520,172

[22] Filed: Aug. 28, 1995

[30] Foreign Application Priority Data

Aug. 29, 1994 [JP] Japan .................................. 6-228903
Sep. 2, 1994 [JP] Japan .................................. 6-234072

[51] Int. Cl.$^6$ .................................................. F16G 13/04
[52] U.S. Cl. .......................................................... 474/215
[58] Field of Search .............................. 474/25, 216, 217, 474/206, 211, 212, 213

[56] References Cited

U.S. PATENT DOCUMENTS 4,507,106  3/1985  Cole, Jr. ............................. 474/215 X
4,904,231  2/1990  Zimmer .............................. 474/215 X
5,026,331  6/1991  Sugimoto et al. .................. 474/215 X

*Primary Examiner*—Roger J. Schoeppel
*Attorney, Agent, or Firm*—Hugh A. Abrams, Esq.; Greg Dziegielewski, Esq.

[57] ABSTRACT

A power transmission chain having a plurality of links, with each link having a pair of apertures. The links are connected by rocker pins inserted in the apertures. The radius of curvature of a convex rocker contact surface of a pair of rocker pins is from approximately 0.6 to 1.6 times the pitch of the chain. In another embodiment, each of the rocker pins includes an arc-like rocker surface, a seat surface, and a flank surface that connects the above two. The aperture includes an arc-like support surface that supports the seat surface and side surface and is located with certain clearance from the flank surface. Also, the chain pitch line is located within the aperture seat surface.

3 Claims, 4 Drawing Sheets

POWER TRANSMISSION CHAIN

Reference is made to U.S. Pat. No. 5,372,554, which relates to the subject matter of the present invention, and is incorporated herein by reference.

BACKGROUND OF THE INVENTION

This invention relates to a power transmission chain. More specifically, it relates to a power transmission chain comprised of a plurality of link plates which are connected by pins and rocker joints.

A silent chain used as power transmission chain for automobiles or motorcycles consists, generally, of a plurality of interleaved links or link-plates. Each link plate has a pair of teeth and a pair of apertures which are connected by pins and rockers, or rocker joints. Each rocker joint includes a pair of long and short pins which are inserted into the pinholes, and rock against one another.

A conventional silent chain is illustrated in FIG. 12. The chain has a construction in which a large number of link plates 50, each having a pair of teeth 51 and apertures or pinholes 52, are connected by rocker joints 60, each of which is composed of a pair of rocker pins 61 inserted in pinhole 52. The configuration of pinhole 52 and rocker pin 61 is shown more clearly in FIG. 13, where flank part 61a of rocker pin 61 contacts pinhole 52 and clearance t' is formed between concave arc surface 61b of rocker pin 61 and pinhole 52.

In the manufacture of silent chain, a preload or tensile load is typically applied after assembly of the chain. The preload causes an alteration of the chain length and provides an initial stress. However, preloading of the chain can also cause cracks or local deformations to occur in the rocker pins on account of the excessive surface pressure generated on the surface of the rocker pins.

In order to prevent the generation of such cracks or local deformations, the surface pressure in the rocker pins is reduced during preloading by increasing the radius of curvature of the rocker pin as much as possible. Such an increase causes wear of the rocker pins and the pinholes when the radius of curvature of the rocker pin is too large.

Usually, a preload (tensile load) is applied to the silent chain after chain assembly for adjustment of the chain length. When the preload is applied to a conventional silent chain, such as shown in FIG. 12, load P' acts on rocker pin 61, as shown in FIG. 13. The flank 61a of the rocker pin 61 presses against the aperture 52 and the aperture 52 is expanded and rocker pin 61 moves to the position shown by the broken line in FIG. 13. As a result, the chain pitch is offset by ΔP with regard to pinhole 52. Therefore, an accurate setting of the chain pitch is not easily attained for the conventional silent chain.

Also, in the conventional silent chain, the dimensions of rocker pin 61 and pinhole 52 are controlled by the distance between flank parts 61a and 61a of rocker pin 61 and the clearances between the aperture wall surfaces and the flank parts 61a. However, the measurement of these dimensions is very difficult, so that dimension control is not easily maintained.

Additionally, in the conventional silent chain, as shown in FIG. 14, the displacement δ of the rocker pin in the flank direction (arrow A) is smaller than the displacement Δ in the chain pitch direction (arrow B), when rocker pin 61 is displaced by action of the preload, which is shown by the broken line in FIG. 14. Therefore, the accuracy of setting of the preload needs to be improved in order to obtain accurate adjustment of the chain pitch.

SUMMARY OF THE INVENTION

This invention is to address the above-described problems and is directed to a power transmission chain which can minimize generation of cracks or local deformations in the rocker pins during preloading and at the same time prevent wear of the rocker pins and pinholes.

This invention is also directed to a power transmission chain in which an accurate chain pitch adjustment can be achieved and dimensional control can be simplified. Another object of this invention is to provide a power transmission chain which can minimize wear of the rocker pins and pinholes and not decrease the fatigue strength.

In one embodiment, the power transmission chain of the present invention includes a plurality of link-plates, each having a pair of pinholes, which are connected by rocker joints inserted in these pinholes. The radius of curvature of the convex surface of the rocker pin is between about 0.6 to about 1.6 times the chain pitch.

By making the radius of curvature of the rocker surface of the rocker pin approximately 0.6 times the pitch or larger, generation of cracks or local deformations can be prevented by reducing surface pressure on the rocker surface during preloading. Furthermore, by having the radius of curvature of the rocker surface approximately 1.6 times or smaller than the pitch, the line of action of the load acting on the rocker pin contact surface can be located within the seat surface formed on the opposite side of the rocker surface of the rocker pin. In this manner, the rolling of the rocker pin inside the pinhole can be prevented and wear of the rocker pin and pinhole can be reduced.

In a second embodiment, the present invention concerns a power transmission chain comprised of a large number of link plates, each having a pair of apertures. The links are connected by rocker joints inserted in the apertures or pinholes. The apertures of the link plates each have a circular arc support surface that engages and supports the seat surface of one of the rocker pins. The aperture also has side support surfaces that are shaped to keep a certain clearance from the side surfaces of the pins. The chain is characterized by having a chain pitch line that crosses the seat surface of the pins.

In this embodiment of the present invention, a certain clearance is allowed between the flank surface of the rocker pin and the side surface of the aperture. The seat surface of the rocker pin is supported by the support surface of the aperture. Therefore, the load acting on the rocker pin is received by the pinhole support surface through the seat surface of the pin so that the aperture is not enlarged by pressing of the rocker pin flank surface into the pinhole side surface, and an accurate chain pitch can be obtained.

Also, as for the dimension control, the dimension between the rocker surface and the seat surface in the chain pitch direction may be easily maintained because the rocker surface and the seat surface are mutually opposite. Also, since the control of the dimensioning is accomplished by measuring the dimension in the chain pitch direction, increased tolerance is permitted in the amount of the preload. As for the dimension control of the apertures, measurement of the dimension is made between the support surface and the opposing pinhole wall surface in the chain pitch direction.

Also, in this embodiment of the present invention, offset contact of the rocker pin with the pinhole, due to its rolling within the pinhole, is prevented because the chain pitch line that passes various contact points of the rocker pins crosses the seat surface when the chain is pulled tightly into a straight position. In this manner, wear of the rocker pins and pinholes can be minimized and loss of fatigue strength can be reduced.

DETAILED DESCRIPTION OF THE PREFERRED EMBODIMENTS

Figure 1:
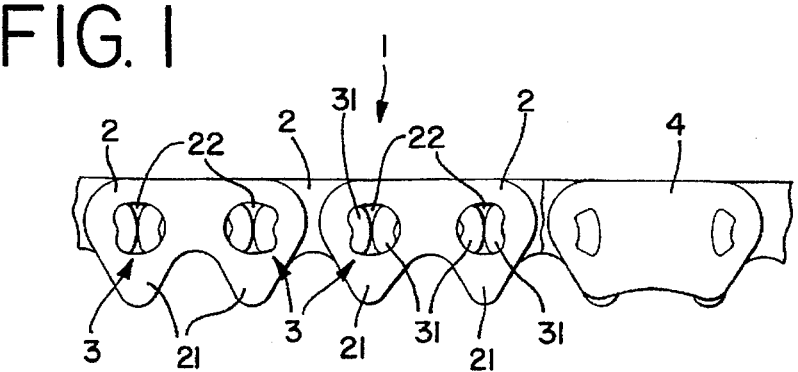
FIG. 1 is a partial cut-out frontal view of a silent chain of one embodiment of this invention.
Figure 2:
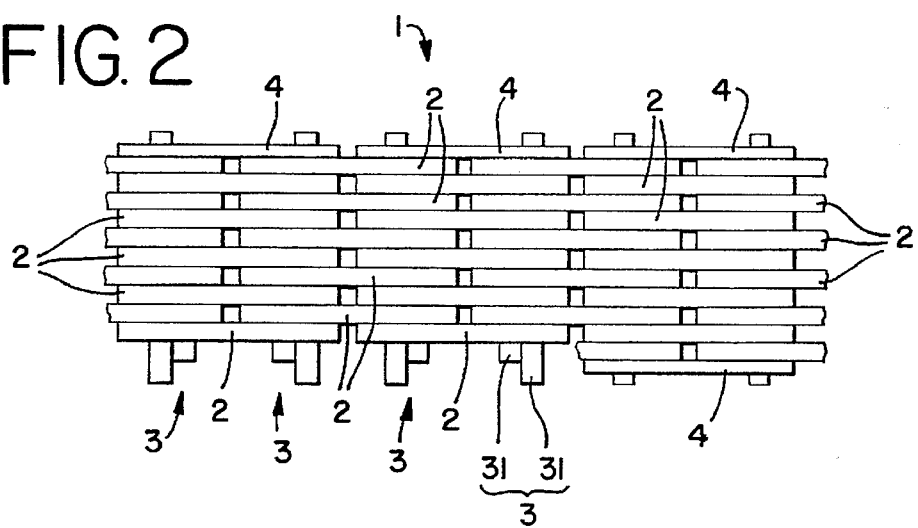
FIG. 2 is a top view of the silent chain of FIG. 1.

Turning now to the drawings, as shown in FIGS. 1 and 2, silent chain 1 is formed of a plurality of link plates 2. Each link has a pair of inverted teeth 21 and apertures 22. The links are interleaved and arranged in rows or sets. Rocker joints 3, which include a pair of long and short rocker pins 31, are inserted in each aperture 22 of the link-plates 2. In addition, guide links 4 are placed on the outer ends of alternating sets of link plates 2 of the chain.

Figure 3:
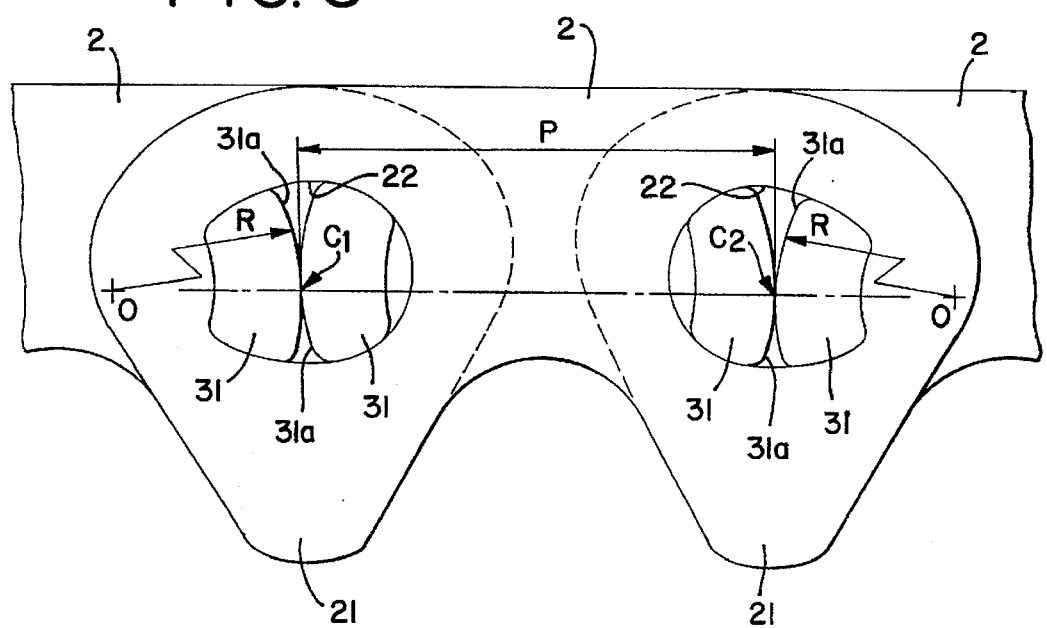
FIG. 3 is an enlargement of a portion of FIG. 1.

The radius of curvature of the rocker surface, which is the convex arc surface of each rocker pin 31, as shown in FIG. 3, satisfies the following relationship, $$R \geq 0.6 \times P$$

where R is the radius of curvature of rocker surface 31a (O is the center of the curvature), and P is the pitch of chain 1.

Here, pitch P is the distance between $C_1$ and $C_2$, where $C_1$ and $C_2$ are the contact points of rocker pins 31 and 31 for each of rocker joints 3 and 3 of link-plate 2, when chain 1 is pulled into the straight position, as shown in FIG. 1. Therefore, the dash-dot line passing through $C_1$ and $C_2$ in FIG. 3 indicates the pitch line.

Figure 4:
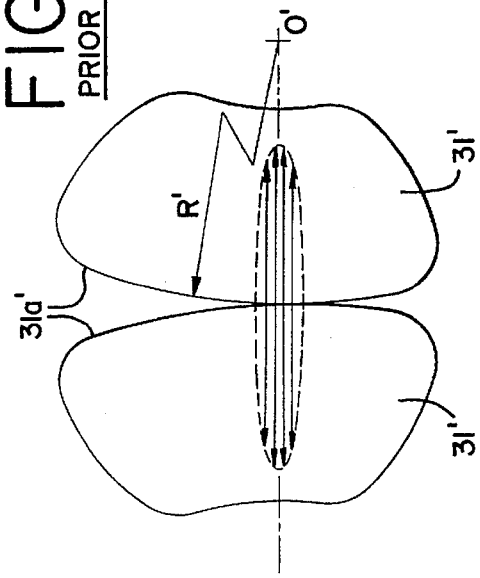
FIG. 4 is a schematic illustration that demonstrates the expected stress concentration in a first embodiment this invention.

When a preload (tensile load) is applied to chain 1, a compression stress acts on contact points $C_1$ and $C_2$ of rocker pins 31 and 31. This compressive stress is distributed as shown in FIG. 4, and the excessive compressive stress at contact points $C_1$ and $C_2$ is prevented. In this manner, cracks and local deformations generated in the pins under the preload can be prevented. Incidentally, FIG. 4 shows an example where, $$R = 0.6 \times P.$$

Figure 7:
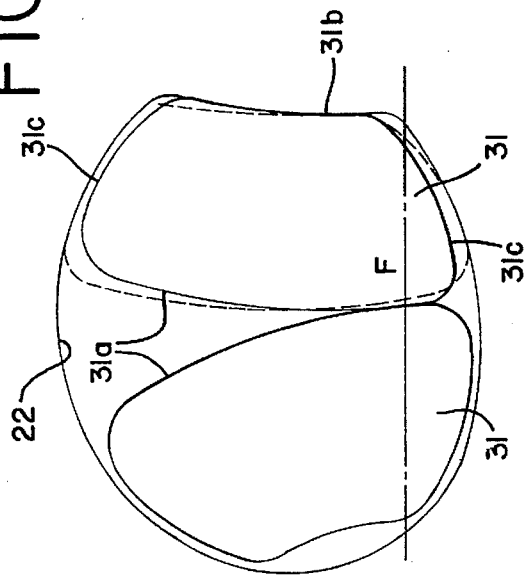
FIG. 7 is a schematic illustration that demonstrates the understood stress concentration in a rocker joint in a conventional chain of the prior art.

In contrast, the radius of curvature of a conventional chain is, $$R' = 0.5 \times P,$$

and when a preload is applied to this conventional chain, the distribution of compressive stress acting in the contact points of rocker pins 31' and 31' is as shown in FIG. 7, where excessive compressive stress is generated.

In addition to the lower limit of the radius, the present invention also attempts to optimize the upper limit of the radius of curvature R. When the radius of curvature is too large, the bending angle of the chain becomes small and its operation with a small number of teeth becomes difficult. Therefore, the pitch line, i.e., the line through contact points $C_1$ and $C_2$ of rocker pins 31 and 31 needs to be displaced for a larger radius of curvature R while maintaining the bending angle of the chain.

On the other hand, the action line of load force F acting on contact points $C_1$ and $C_2$ moves outside and below surface 31b, which is formed on the side opposite to rocker surface 31a of rocker pin 31, as shown by the dash-dot line in FIG. 6.

Figure 6:
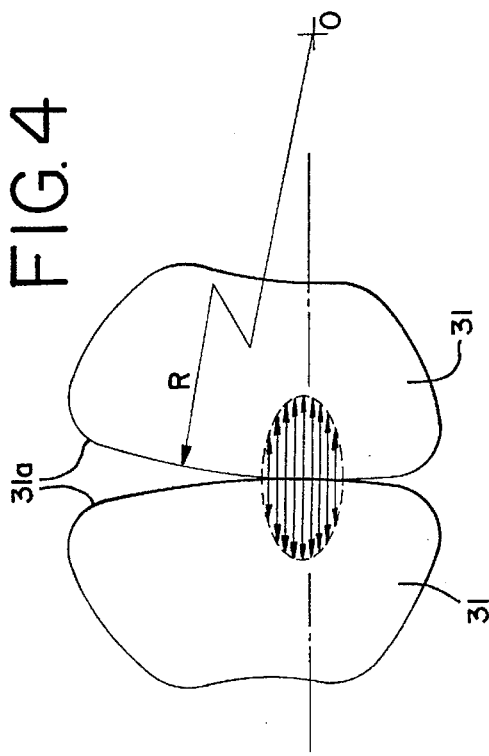
FIG. 6 is illustrates the disadvantages of too large s of curvature in a rocker pin.

In this situation, rocker pin 31 rotates (rolls) inside pinhole 22 and takes a position shown by the broken line in FIG. 6, and side surface 31c of the rocker pin contacts with pinhole 22. As a result, side face 31c of the rocker pin and pinhole 22 are worn.

Figure 5:
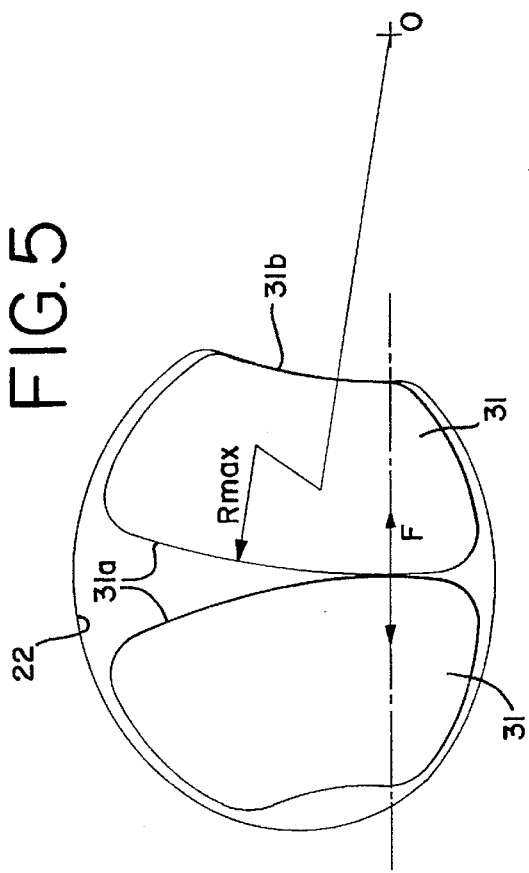
FIG. 5 is a schematic illustration that demonstrates the expected location of the force in a first embodiment of this invention.

Consequently, the action line of load force F, acting on rocker pin 31, needs to be at least within seat surface 31b to prevent such wear of rocker pin 31 and pinhole 22. Therefore, the upper limit of the radius of curvature R is the radius of curvature when the action line of load force F is at the edge part of seat surface 31b, as shown in FIG. 5. It means that, $$R_{max} 1.6 \times P.$$

The above can be summarized as, $$0.6 \times P \leq R \leq 1.6 \times P$$

for the radius of curvature R of rocker surface 31a of rocker pin 31. Thus, the power transmission chain of this embodiment has a radius of curvature of the convex rocker surface of rocker pins that comprise the rocker joint, from approximately 0.6 to 1.6 times the pitch.

As shown above, in this example of one embodiment of the present invention, the radius of curvature R of rocker surface 31a is set at a length that minimizes the generation of cracks and local deformation in the rocker-pins. Wear of the rocker pin and aperture surfaces can be minimized by lowering the surface-pressure on the rocker-surface under action of preload, and restricting the rolling of the rocker pin.

While the present example has shown an application of this invention to a silent chain, this invention can be applied similarly to the rocker joint type random chain and CVT (continuously variable transmission) chain, such as shown in Japanese Laid-Open Patent Application Heisei 1-145447.

Figure 8:
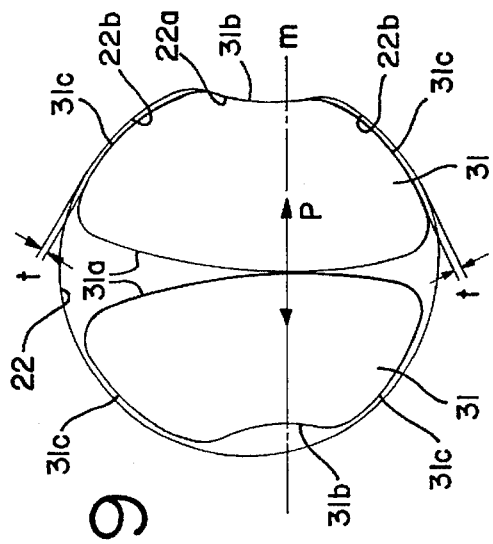
FIG. 8 is an enlargement of a portion of FIG. 1.
Figure 9:
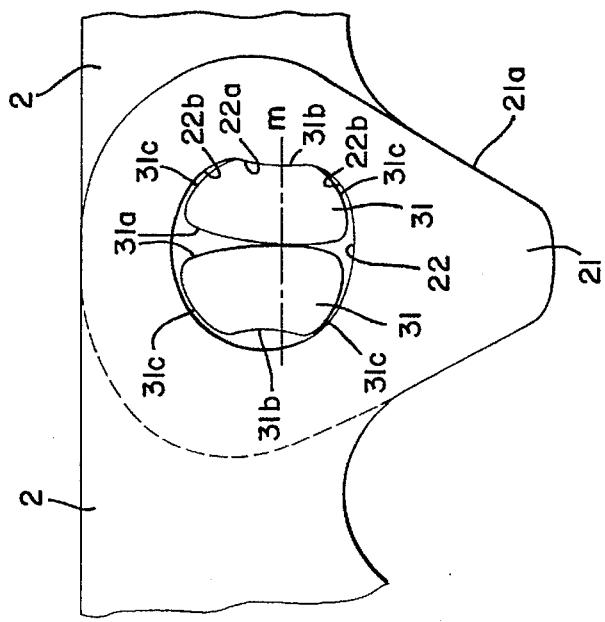
FIG. 9 is an enlargement of the pinhole part of FIG. 8.

A second embodiment of the present invention is shown in FIGS. 8 and 9. Aperture 22 has an arc-like support surface 22a formed on the outer back surface 21a of link-plate 2 and side surface 22b which connects to the support surface. Rocker pin 31 is composed of arc-like rocker surface 31a, arc-like seat surface 31b formed on the opposite side of the pin and flank surface 31c that connects the above two surfaces. Also, as shown in the figure, the dash-dot line m is the chain pitch line that connects the contact points of rocker pin 31 when chain 1 is stretched into the straight-pull position. As shown in these figures, pitch line m intersects seat surface 31b.

Seat surface 31b of rocker pin 31 is therefore supported by support surface 22a of aperture 22. A certain clearance t is allowed between flank surface 31c of rocker pin 31 and side surface 22b of pinhole 22. This clearance is set preferably at t=0.03 mm.

When the preload (tensile load) is applied to chain 1 of this construction, load P acts on rocker surface 31a of rocker pin 31 (see FIG. 9). This load P is borne by support surface 22a of aperture 22 and by seat surface 31b that opposes rocker surface 31a. Accordingly, aperture 22 is not enlarged or altered by the pressing of flank surface 31c of rocker pin 31 into side surface 22b of pinhole 22 during preloading. Thus, the chain pitch can be set accurately.

Figure 10:
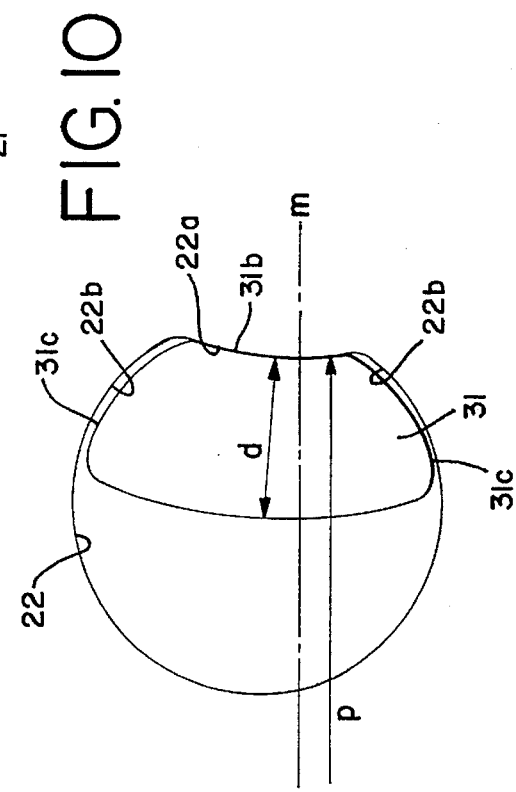
FIG. 10 is an illustration of the dimension control attained by a second embodiment of this invention.
Figure 12:
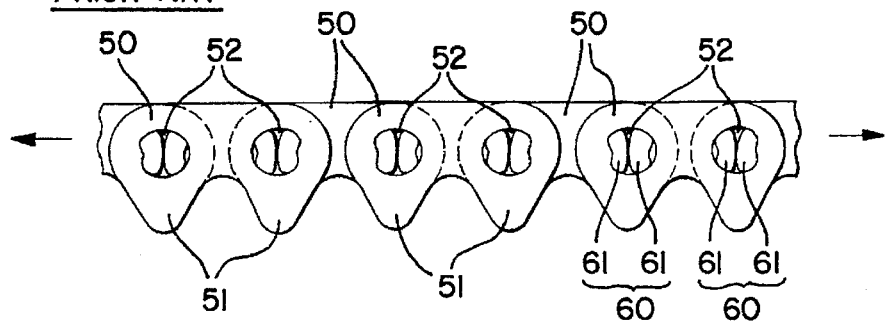
FIG. 12 illustrates a conventional silent chain of prior art.
Figure 13:
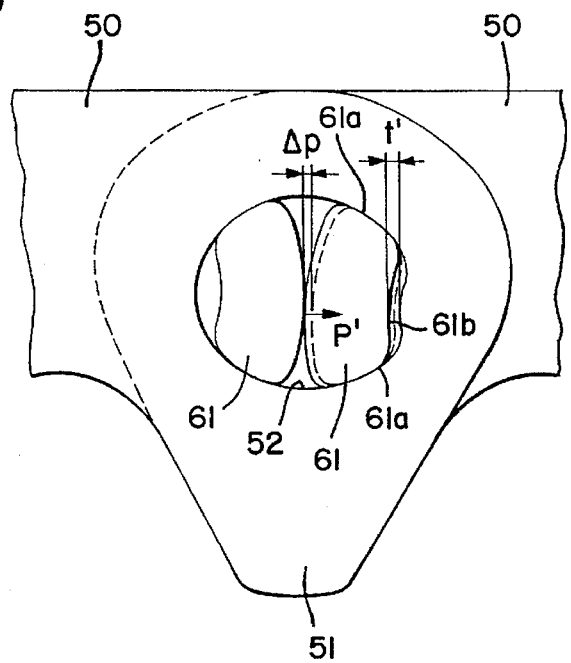
FIG. 13 illustrates a disadvantage of conventional silent chain of the prior art.
Figure 14:
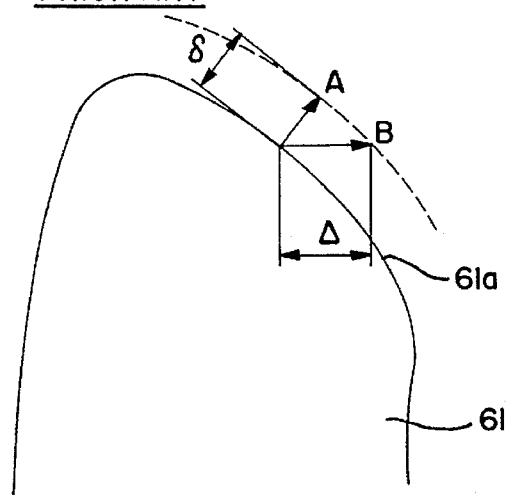
FIG. 14 illustrates a disadvantage of the conventional silent chain of the prior art.

Also, measurement of thickness d of rocker pin 31 (see FIG. 10), i.e., the clearance between seat surface 31b of rocker pin 31 and opposing rocker surface 21a, permits dimensional control of rocker pin 31. The dimension of pinhole 22 is control d by measurement of the clearance between support surfaces 22a of pinholes 22 along pitch line m, i.e., hole pitch p (see FIG. 10). Also, the accuracy of setting of the preload need not be as high because of control of the dimension in the chain pitch direction.

Figure 11:
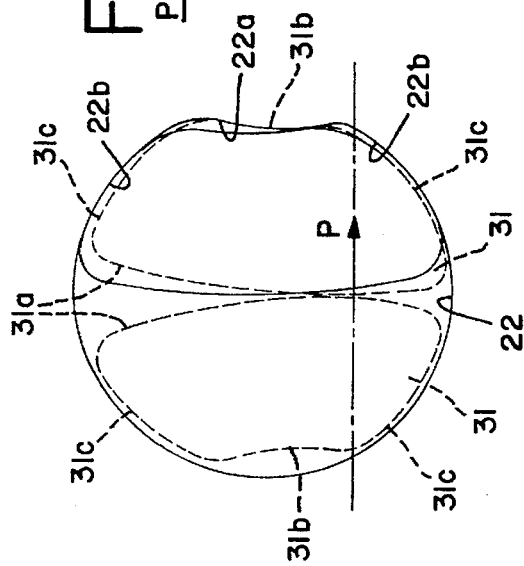
FIG. 11 illustrates a conventional chain with a chain pitch line below the seat surface.

In addition, the situation in which the chain pitch line m is outside of and below seat surface 31b, as in FIG. 11, is considered. In a case, rocker pin 31 makes offset contact with pinhole 22 due to its rolling within pinhole 22 when P, due to prestress, acts as shown by the solid line in same figure. As a result, flank surface 31c of rocker pin 31 and side surface 22b of pinhole 22 wear. Also, part of side surface 22b of the pinhole where the rocker pin contacts under pressure acts as the point origin of fatigue, which decreases the fatigue strength of link-plate 2.

Therefore, in this embodiment of the invention, chain pitch line m is located within seat surface 31b (see FIGS. 8 and 9). Thereby, the offset contact of rocker pin 31 with pinhole 22, due its rolling within pinhole 22 when load P acts, is and, as a result, wear of rocker pin 31 and p 22 is prevented and decrease of fatigue strength is suppressed.

Incidentally, while this embodiment of the invention applies to a silent chain this invention can be applied similarly to a rocker-joint-type random chain and CVT (Continuously Variable Transmission) chain as shown in Japanese Laid-Open Patent application Heisei 1-145447.

Thus, as shown above, each rocker pin that comprises the rocker joint is comprised of the arc-like rocker surface, the seat surface and flank surface that connects the above two. The pinhole in the link-plate is composed of the arc-like support surface that supports the seat surface and the side surface provides a certain clearance from the flank surface. Therefore, the chain pitch can be set accurately and dimension control is maximized.

Also, the chain pitch line is on the seat surface in the power transmission chain of this embodiment. Therefore, wear of rocker pin and pinhole is minimized and decrease of the fatigue strength is suppressed.

What is claimed is:

1. A power transmission chain comprised of a plurality of interleaved links, each link having a pair of apertures, said links being connected by rocker pins inserted in the apertures, the radius of curvature of the convex surface of a rocker pin is 0.6 times to 1.6 times the chain pitch.

2. A power transmission chain comprised of a plurality of interleaved links, each of said links having a pair of apertures, said links being connected by rocker pins inserted in the apertures of the links, each aperture having an arc-like support surface that supports the seat surface of one of the rocker pins while being located on the side of said link, said aperture having a side surface that connects to the support surface and is spaced part from the flank surface of the rocker pin when said seat surface of said pin is fully seated against aid support surface of said aperture.

3. The power transmission chain of claim 2, wherein said chain has a chain pitch line crossing the seat surface.

* * * * *

US005651746B1

REEXAMINATION CERTIFICATE (3969th)

United States Patent [19]

Okuda

[11] B1 5,651,746
[45] Certificate Issued Jan. 4, 2000

[54] POWER TRANSMISSION CHAIN

[75] Inventor: Tomonori Okuda, Nabari, Japan

[73] Assignee: Borg-Warner Automotive, K.K., Nabari, Japan

Reexamination Request:
No. 90/004,957, Apr. 9, 1998

Reexamination Certificate for:
Patent No.: 5,651,746
Issued: Jul. 29, 1997
Appl. No.: 08/520,172
Filed: Aug. 28, 1995

[30] Foreign Application Priority Data

Aug. 29, 1994 [JP] Japan .................................. 6-228903
Sep. 2, 1994 [JP] Japan .................................. 6-234072

[51] Int. Cl.[7] .................................................. F16G 13/04
[52] U.S. Cl. ............................................................ 474/215

[56] References Cited

U.S. PATENT DOCUMENTS

| | | | |
|---|---|---|---|
| 2,653,485 | 9/1953 | MacArthur | 74/253 |
| 3,213,699 | 10/1965 | Terepin | 74/251 |
| 3,742,776 | 7/1973 | Avramidis | 74/251 S |
| 4,010,656 | 3/1977 | Jeffrey | 74/245 S |
| 4,186,617 | 2/1980 | Avramidis et al. | 74/245 S |
| 4,345,904 | 8/1982 | Numazawa et al. | 474/215 |
| 4,737,137 | 4/1988 | Miyaishi | 474/245 |
| 4,758,210 | 7/1988 | Ledvina | 474/212 |
| 4,764,158 | 8/1988 | Honda et al. | 474/212 |
| 4,801,289 | 1/1989 | Sugimoto et al. | 474/215 |
| 4,904,231 | 2/1990 | Zimmer | 474/214 |
| 4,911,682 | 3/1990 | Ivey et al. | 475/245 |
| 5,026,331 | 6/1991 | Sugimoto et al. | 474/214 |
| 5,236,399 | 8/1993 | Sugimoto et al. | 474/215 |
| 5,236,400 | 8/1993 | Tsuyama | 474/217 |
| 5,242,333 | 9/1993 | Sugimoto et al. | 474/212 |
| 5,242,334 | 9/1993 | Sugimoto et al. | 474/215 |
| 5,372,554 | 12/1994 | Okuda | 474/206 |

FOREIGN PATENT DOCUMENTS

| | | |
|---|---|---|
| 41-2805 | 2/1967 | Japan . |
| 62-196950 | 12/1987 | Japan . |
| 5-22666 | 12/1988 | Japan . |
| 1-55821 | 11/1989 | Japan . |
| 6-207643 | 7/1994 | Japan . |
| 51-1815 | 1/1996 | Japan . |

*Primary Examiner*—Roger Schoeppel

[57] ABSTRACT

A power transmission chain having a plurality of links, with each link having a pair of apertures. The links are connected by rocker pins inserted in the apertures. The radius of curvature of a convex rocker contact surface of a pair of rocker pins is from approximately 0.6 to 1.6 times the pitch of the chain. In another embodiment, each of the rocker pins includes an arc-like rocker surface, a seat surface, and a flank surface that connects the above two. The aperture includes an arc-like support surface that supports the seat surface and side surface and is located with certain clearance from the flank surface. Also, the chain pitch line is located within the aperture seat surface.

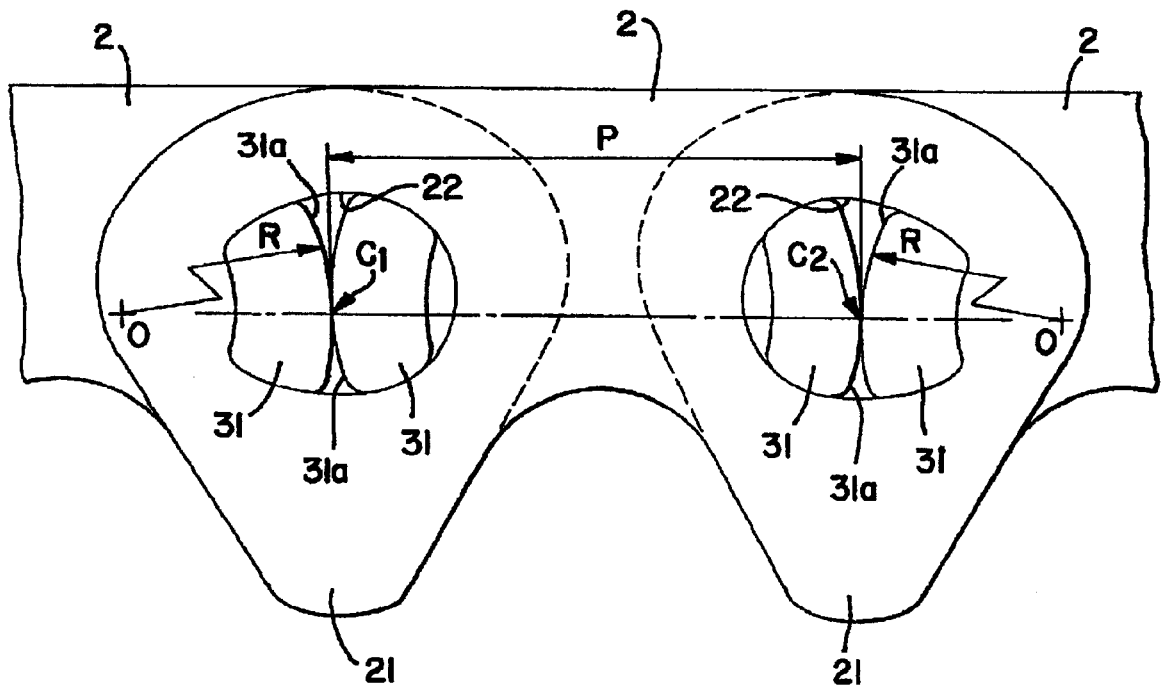

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 57–62:

Here, pitch P is the distance between $C_1$ and $C_2$, where $C_1$ and $C_2$ are the contact points of rocker pins 31 and 31 for each of rocker joints 3 and 3 of link-plate 2, when chain 1 is pulled into the straight position, *under preload (tensile load)*, as shown in FIG. 1. Therefore, the dash-dot line passing through $C_1$ and $C_2$ in FIG. 3 indicates the pitch line.

AS A RESULT OF REEXAMINATION, IT HAS BEEN DETERMINED THAT:

Claims 1, 2 and 3 are determined to be patentable as amended.

New claims 4–6 and 7 are added and determined to be patentable.

1. A *preloaded* power transmission chain comprised of a plurality of interleaved links, each link having a pair of apertures, said links being connected by rocker pins inserted in the apertures, [the] *said rocker pins of a first aperture of said chain link having a first rocker joint contact point when said chain is in a straight-pull position under preload, said rocker pins of the other aperture of said chain link having a second rocker joint contact point when said chain is in said straight-pull position under preload, a preload chain pitch being defined as the distance between said first and second rocker joint contact points under preload, and a* radius of curvature of [the] *a* convex surface of a rocker pin is 0.6 times to 1.6 times the *preload* chain pitch.

2. A *preloaded* power transmission chain comprised of a plurality of interleaved links, each of said links having a pair of apertures, said links being connected by rocker pins inserted in the apertures of the links, each aperture having an arc-like support surface that supports [the] *a* seat surface of one of the rocker pins while being located on [the] *a* side of said link, said aperture having a side surface that connects to the support surface and is spaced [part] *apart* from [the] *a* flank surface of the rocker pin when said seat surface of said pin is fully seated against [aid] *said* support surface of said aperture *when said chain is in a straight-pull position under preload*.

3. The *preloaded* power transmission chain of claim 2, wherein *said rocker pins of a first aperture of said chain link have a first rocker joint contact point when said chain is in a straight-pull position under preload, said rocker pins of the other aperture of said chain link have a second rocker joint contact point when said chain is in said straight-pull position under preload, a preload chain pitch line being defined as the line extending between said first and second rocker joint contact points under preload,* said chain has a *preload* chain pitch line crossing the seat surface.

*4. The preloaded power transmission chain of claim 1 wherein each of said links has a pair of inverted teeth adapted for contacting the teeth of a sprocket.*

*5. The preloaded power transmission chain of claim 1 wherein each of said rocker pins has an identical cross-sectional shape.*

*6. The preloaded power transmission chain of claim 1 wherein each said radius of curvature of the convex surface of each rocker pin is identical.*

*7. The preloaded power transmission chain of claim 3 wherein each of said links has a pair of inverted teeth adapted for contacting the teeth of a sprocket.*

* * * * *